Aug. 11, 1964     E. R. HEAD     3,144,018
CARDIAC MONITOR APPARATUS
Filed March 23, 1961
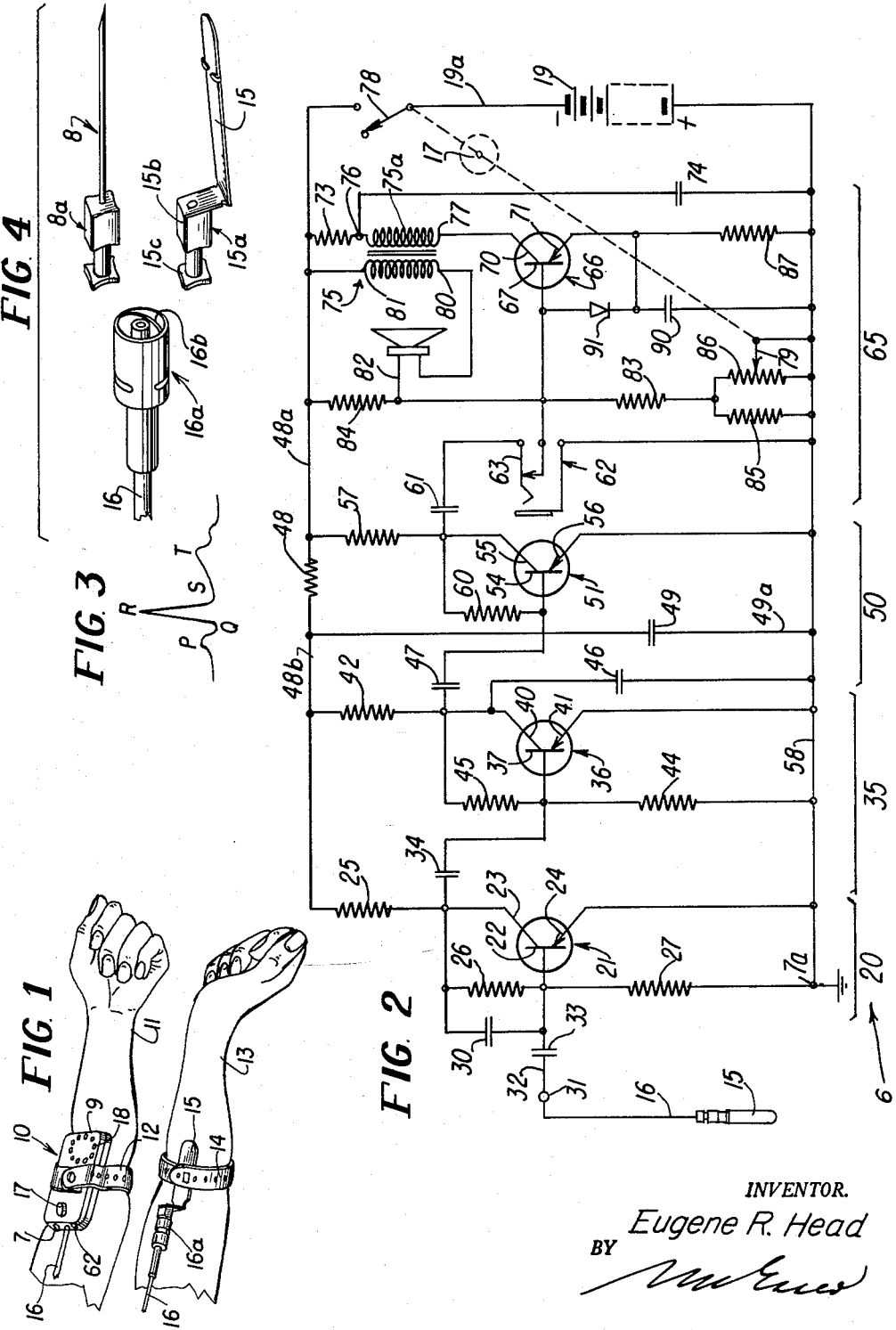
INVENTOR.
Eugene R. Head
BY

United States Patent Office 3,144,018
Patented Aug. 11, 1964

3,144,018
CARDIAC MONITOR APPARATUS
Eugene R. Head, Geneva, Ill., assignor, by mesne assignments, to Chemetron Corporation, a corporation of Delaware
Filed Mar. 23, 1961, Ser. No. 97,804
8 Claims. (Cl. 128—2.1)

The present invention relates to a monitor apparatus which is responsive to periodically recurring potential pulses of relatively low magnitude under conditions where reliability of response to such pulses is of utmost importance. Such apparatus may have applications in such fields as cardiac monitoring, and related fields. In particular, a desirable field of application relates to cardiac monitoring wherein there are present body potentials incident to life processes, particularly heart beats of a living creature or person under conditions such as surgery where monitoring of the utmost reliability is the objective. The present invention will be described in connection with a cardiac monitor of a type comprising an electrical circuit enclosed in a relatively small case adapted for attachment to the forearm of a human patient in which the case functions as an electrode for the monitor, the monitor being provided with another electrode adapted for attachment to a spaced portion of the patient's body such as the other forearm, as generally disclosed in U.S. Patent 3,052,233 granted on September 4, 1962, to William F. Veling, with the understanding, however, that the electrodes of the monitor apparatus which receive the potentials to be monitored may be connected to piezo crystals and other transducers which have the property of generating potentials in response to movement or forces, as well as parts of a living organism which generates its own body potentials.

Cardiac monitors are useful during anesthesia and surgery and in the critical recovery period following surgery to provide a continuous indication of heart action and instantaneous warning of heart abnormalities such as cardiac arrest or ventricular fibrillation so that corrective action may be promptly instituted. In view of this critical usage, it is essential that the indications of cardiac action be accurate, positive, and dependable. It is therefore an important object of the invention to provide a cardiac monitor characterized by extreme sensitivity and stability, and which includes a self-contained long life power supply.

Another object is to provide a relatively compact, yet completely reliable cardiac monitor which includes means for preventing spurious signals caused by somatic tremor and is adapted for mounting on a portion of a patient's body such as the patient's left forearm.

A further object of the invention is to provide an improved cardiac monitor having means to adjust its sensitivity to obtain a heart signal pattern based upon a selected amplitude of the electrocardiogram complex.

Another object is to provide a heart monitor which includes means for preventing voltage load surges from reaching its power supply line.

A still further object of the invention is to provide a heart monitor having an oscillator stage including means to prevent a low frequency hunting condition due to positive feedback.

Still another object of the invention is to provide an improved cardiac monitor having the above characteristics, which includes means for quickly and interchangeably connecting either plate electrodes or needle electrodes to the monitor as desired, without the use of adapters or tools.

Briefly stated, in accord with the illustrated embodiment of the invention, there is provided an improved heart monitor comprising an electrical circuit enclosed in a relatively small case which also functions as one of the monitor's electrodes. The case and the other electrode which is of the plate type and connected to the end of a lead projecting from the case are adapted for attachment to spaced portions of the patient's body to measure electrical potentials due to the electrical activity of the heart. The lead is provided with a connector of a quick-connect type which is adapted to engage either a plate electrode or a needle electrode consisting of a standard hypodermic needle as may be desired. The circuit includes the electrodes, a self-contained power supply within the monitor case, three amplifier stages, and an oscillator stage. The first amplifier stage includes high frequency attenuation means for minimizing spurious signals due to somatic tremor. Also included in the circuitry of the monitor are means for decoupling the oscillator stage from the power supply lines to prevent voltage load surges from reaching the power supply lines, and means for diverting unwanted signals occurring in the oscillator stage to prevent a low frequency hunting condition. In the illustrated embodiment the oscillator stage is connected to a speaker to provide audible signals representative of heart action. In addition, a jack is provided between the amplifier stages and the oscillator stage to divert the output of the amplifier stages for use in external indicators. A control knob is provided to operate an on-off switch and to adjust sensitivity so as to obtain signals related to a selected electrocardiogram (ECG) complex amplitude level. The relative adjustment of the control knob determines whether the signal indication represent the single high amplitude level peak of the ECG complex R wave, or includes other peaks of lesser amplitude obtained by adjustment for greater sensitivity.

The invention both as to its organization and method of operation together with further objects and advantages, will be described in greater detail below in connection with the accompanying drawing in which:

FIG. 1 is fragmentary perspective view illustrating the present invention as it may be connected for monitoring the heart of patient;

FIG. 2 is a schematic electrical circuit diagram of the heart monitor apparatus of the present invention;

FIG. 3 is a graphical representation of one complete cycle of the ECG complex or wave form pattern of the potentials measured on a human body due to the electrical activity of a normal heart; and FIG. 4 is a fragmentary perspective view of a monitor lead and its conncetor and two types of electrodes with which it is engageable.

Referring more particularly to the drawing, FIG. 1 illustrates the improved cardiac monitor apparatus, generally indicated at 10, preferably attached to the left forearm 11 of a patent by means of a preferably electrically conductive strap 12. The monitor apparatus case or casing indicated at 9 is of a suitable conductive material such as stainless steel and functions as one of the electrodes for the monitor apparatus. Attached to the right forearm 13 of the patient by a preferably electrically conductive strap 14 is the other electrode 15 which is connected to the monitor 10 by a lead 16. The lead 16 is provided with an approximately cylindrical female terminal connector 16a (see FIG. 4) arranged for making a quick connection with a cooperating male connector 15a on electrode 15. This is accomplished by means comprising cooperating interlocking conformations on the connectors 15a and 16a. Specifically, connector 15a is provided with an approximately square cross-section shank 15b, and with a projecting thread portion 15c formed on the end of its shank adapted for engagement with a corresponding spiral thread groove 16b on the inside of the wall of connector 16a. To engage the connectors, the electrode connector 15a is simply inserted in lead connector 16a and given a quarter turn, thereby positively interlocking the connectors 15a and 16a and completing the connection to the monitor circuit. The connectors 16a and 15a are, respectively, substantially identical with the connector on the end of a conventional hypodermic syringe such as the standard Becton Dickinson & Co. "Luer-Lok" coupling shown and described in U.S. Patent 2,076,121 to Dickinson and used on most hypodermic syringes, and the cooperating standard "Luer-Lok" coupling connector 8a (FIG. 4) on the end of a standard hypodermic needle 8 as used in most hospitals and physician's offices. The described arrangement thus provides a simple, quickly made positive electrical connection and permits the plate electrode 15 to be used interchangeably with a needle electrode comprising a standard (21-25 gauge) hypodermic needle for monitor use as desired and without the use of conventional adapters, tools, set screws, etc. Needle electrodes increase the strength of signal pickup and may be more advantageous in certain applications such as infant and animal surgery where a good connection cannot be obtained by normal procedures.

Although mounting of the monitor on the left forearm as shown in FIG. 1 is preferred, experience with the illustrated embodiment indicates that it may be placed on either the right or the left forearm and any reasonable placement of the electrode on the body bridging the heart, for example, on the legs or on an opposite arm and leg will give a satisfactory signal.

At times it may not be desirable to mount the monitor on the body, as in infant or small animal surgery. For these instances the monitor may be provided with an accessory lead (not shown) for plugging into an appropriate jack on the monitor case such as the jack 7 indicated in FIG. 1 connecting the accessory lead (not shown) by appropriate means (not shown) to a terminal 7a connected to ground (FIG. 2). When plugged into the monitor the accessory lead, of course, becomes an extension of the monitor case electrode. The accessory lead may advantageously be provided with a connector such as the connector 16a described above for quick engagement with a plate electrode such as the electrode 15 (FIG. 2 and FIG. 4) or a needle electrode such as the needle 8 (FIG. 4).

The monitor 10 is provided with a control knob 17 which functions to operate as an on-off switch and to adjust the sensitivity of the monitor as described more fully below. The casing of the monitor may also be provided with a plurality of sound ports 18 to facilitate sound distribution.

Referring more particularly to the monitor circuit diagram shown in FIG. 2, the circuit broadly comprises an amplifier 6 having a first amplifier stage 20 including a transistor 21, a second amplifier stage 35 including a transistor 36, and a third amplifier stage 50 including a transistor 51, and an oscillator or fourth stage 65 including a transistor 66, all mounted on a suitable chassis, not shown, enclosed by the monitor case 9. The transistors 21, 36, 51 and 66 may be of any suitable type or types, for example, TI (Texas Instruments Incorporated) Type 2N1274. All four stages are powered by a suitable self-contained long-life power supply, for example, a mercury battery 19 of 6½ volts D.C. normal rating. The first stage 20 is basically a Class A amplifier stage with an input impedance approximately matched to that of an average human patient and including a PNP transistor 21 having a base 22, a collector 23 and an emitter 24. Stage 20 is a common emitter stage using a resistor 25 as its collector load. The base of stage 20 is stabilized by the resistor pair 26 and 27 to give it increased temperature stability.

In utilizing a heart monitor the object of course is to pick up a signal indicative of heart action. This signal may be for convenience termed a "wanted" signal. However, the living human body is also continuously generating other electrical signals such as signals due to muscular activity described as somatic tremor, etc. This last mentioned group of signals for convenience in connection with the use of a heart monitor may be termed "unwanted" signals. The frequency range of these "unwanted" or spurious signals is of a much higher order than the frequency range of the "wanted" heart action signal. In order to obtain the most satisfactory "wanted" signal, it has been found advantageous to provide means to eliminate or at least minimize unwanted signals and interference caused by somatic tremor. This has been accomplished by supplementing the resistor 26 with a capacitor 30 connected in parallel with it to provide increased negative feedback in the high frequency spectrum. The effect of this high frequency attenuation is to minimize interference by unwanted or spurious signals such as signals caused by somatic tremor. A capacitor 30 having a capacitance rating of 0.5 microfarad has provided the most accurate heart action signal results in the illustrated embodiment. However, satisfactory performance can be obtained with a capacitor having a capacity in the range of 0.17 to 1.5 microfarads. If the capacity of the capacitor 30 is much lower than 0.17, then little improvement can be obtained as regards the attenuation of the unwanted high frequency signal. On the other hand, if the capacity of capacitor 30 is greater than 1.5 microfarads, interference with the wanted heart signal then becomes objectionable.

It has been found most effective to provide this high frequency attenuation in first amplifier stage 20; however, it will be understood that less desirable results could be obtained by placing a capacitor corresponding to the capacitor 30 in parallel with a feedback resistor in either the second or third amplifier stages.

The monitor is provided with an input terminal 31 to which lead 16 is connected and which, in turn, is connected to the first amplifier stage by a line 32. The line 32 includes means to prevent D.C. leakage through the patient's body from affecting the transistor bias consisting of an input capacitor 33 disposed in the line.

The output of stage 20 is taken through a coupling capacitor 34 and applied to the second amplifier stage 35. The amplifier stage 35 includes a PNP transistor 36 having a base 37, a collector 40, and an emitter 41. The amplifier stage 35 is again a class A amplifier stage using a resistor 42 as its collector load and having its base stabilized by a pair of resistors 44 and 45. The collector to base resistor 45 also provides negative feedback. The output of stage 35 is modified by an integrating capacitor 46. This capacitor 46 serves to modify the electrocardiogram signal complex so as to present a new complex having a longer time base, thus providing a longer "on time" for the final oscillator stage. The modified output of the second stage 35 is taken by the coupling capacitor 47 and applied to the third amplifier stage 50.

The circuit shown in FIG. 2 includes means to de-couple the battery or B− supply 19 from the first two amplifier stages. This de-coupling means consists of the resistor-capacitor pair 48 and 49. The resistor 48 is disposed in a line 48a which is connected to the negative terminal of the battery 19 when the knob 17 is turned to its "on" position and the capacitor 49 is disposed in a line 49a connected between a line 48b and a line 58 connected to ground and the positive terminal of the battery 19. The purpose of this de-coupling is to prevent battery voltage surges under audio load from being reflected into the stages 20 and 35 which are relatively high gain stages in that the gain of stage 20 may be in the range of 80 to 100 decibels and the gain of stage 35 may be in the range 50 to 30 decibels, while the gain of the third stage 50 may be somewhat lower in the range 30 to 20 decibels.

The output of the second stage 35 is applied to the third amplifying stage 50 for further power gain. Stage 50 is again a conventional class A amplifier stage which includes a PNP transistor 51 having a base 54, a collector 55, and an emitter 56. The transistor 51 uses a resistor 57 as its collector load, this collector load being the only amplifier transistor collector load connected directly to the battery through the switch 78. Stage 50 is stabilized by a resistor 60, which has a dual function of biasing and providing negative feedback. At this point, it should be noted that stage 50 is the only amplifier stage to take its power from the battery power supply 19 without de-coupling. The output of stage 50 is taken by a coupling capacitor 61, and applied to a contact 63 of a jack 62.

The jack 62 provides a means for diverting the output of the first three amplifier stages for use in triggering an external indicator such as a visual signal including a signal lamp. Such a visual indication is favored for post-operative observation, as for example in an intensive care unit or recovery room where several post-operative patients may be under surveillance of only one or two nurses or other personnel. However, in the illustrated embodiment, the output of the first three stages is fed through the jack 62 and applied to the base of the fourth and final stage 65 which is an oscillator stage.

Stage 65 is basically a Hartley oscillator circuit modified for utilization in the illustrated heart monitor embodiment. Stage 65 includes a PNP transistor 66, having a base 67, a collector 70, and an emitter 71. The oscillator stage 65 is de-coupled from the power supply 19 by means of a resistor-capacitor pair, the resistor 73 connected between line 48a and a terminal 76, and the capacitor 74 which is connected between terminal 76 and line 58. The capacitor 74 is thus connected in the monitor circuit in series with resistor 73, and in parallel with power supply 19 and the serially-connector load circuit of oscillator stage 65 consisting of the primary winding 75a of a transformer 75 described below, transistor 66, and an emitter resistor 87. The described arrangement substantially prevents voltage surges under audio load from reaching the B— supply line 19a connected to B— supply 19. This de-coupling means thus makes it unnecessary to filter out audio load voltage surges from the B— supply line since the illustrated de-coupling means prevents the surges from ever entering the supply line.

The oscillator stage 65 includes a suitable transformer 75 having terminals 76 and 77 on its primary winding 75a, and terminals 80 and 81 on its secondary winding. The transformer 75 is phased so that the voltage between terminals 76 and 77 is in phase with the voltage between terminals 80 and 81; in other words, terminals 76 and 81 are effectively a tap on a single winding. The secondary voltage is out of phase with the primary voltage and is applied through a conventional crystal speaker 82 to the base of the transistor 66. This out-of-phase voltage provides the necessary feedback necessary for oscillation. The crystal speaker 82 is essentially capacitive and therefore the feedback circuit has no effect on the D.C. biasing of the transistor 66. The biasing of the transistor 66, and hence its readiness to oscillate, is controlled by a combination of resistors 83, 84, and 85, and a rheostat 86. The rheostat 86 is controlled for sensitivity adjustment by knob 17 which also operates an on-off switch 78. The rheostat 86 therefore controls the bias on the oscillator until a signal is fed from the first three stages through the jack 62, to the base 67 of the oscillator. If the rheostat 86 is set so as to provide a bias just under the point of oscillation, any negative signal fed through the jack 62 will raise this bias to the point of oscillation and an audible tone will be heard from the speaker 82. Accordingly, the amplitude of signal required to produce the audio oscillation is therefore controlled by rheostat 86 which determines how far below the point of oscillation the quiescent D.C. bias is maintained.

In order to stabilize the action of the oscillator transistor 66, at any given value of quiescent bias, its obsolute value of bias has a component fixed by the voltage drop in an emitter resistor 87. The oscillator circuit also includes means to lower the impedance of the emitter circuit to the audio tone. This means consists of the capacitor 90 which provides means for bypassing the resistor 87, which if not bypassed would materially decrease the audio output power. Effectively, the base to emitter bias is the difference in voltage drops across ressistor 83, rheostat 86, and resistor 87. Temperature stability for transistor 66 is provided, in part, by the interaction of these voltage drops. It should be mentioned again that the voltage drop across resistor 83 and rheostat 86 is controlled by the position of movable contact 79 on the rheostat 86.

When the transistor is oscillating, the emitter to base junction provides for signal rectification to such an extent that the base itself tends to assume a positive charge with respect to ground resulting from the signal rectification. This positive charge tends to be fed back and stored in the coupling capacitor 61, which tendency reflects on the bias circuit of the oscillator stage in such a manner as to generate a low frequency hunting condition whose frequency is controlled by the time constant of capacitor 61 acting on resistor 83 and rheostat 86, charge and discharge. This hunting action results in erratic response of the oscillator transistor 66 to the signal fed from the first three stages. To eliminate this effect, a diode 91 is placed in the circuit to shunt out the rectified signal appearing on the base of the oscillator. Whenever the base of transistor 66 tends to go positive with respect to ground, this tendency is minimized by the shunting effect of the diode 91. The diode does not shunt out the feedback circuit because of the forward conduction characteristics of the diode. In other words, the diode is not a perfect shunt.

Referring now to the mode of operation of the monitor 10 in monitoring the heart of a patient, the monitor 10 is applied to an appropriate part of the patient's body such as forearm 11 illustrated in FIG. 1. For optimum electrical contact between the patient's body and the monitor, electrolytic jelly may be placed on the skin and rubbed to insure good electrical contact. The case or casing 9 of monitor 10 is then secured to the forearm by strap 12 which is preferably of the conductive type as described above. Lead 16 is then extended to another part of the body, such as the right forearm 13, electrolytic jelly placed on the forearm skin surface and electrode 15 strapped thereon by strap 14. After the monitor has been thus attached to the patient's body the "on-off" switch 78 is then operated to the "on" position by means of control knob 17. Control knob 17 is then turned to adjust the position of movable contact 79 relative to rheostat 86 to control the sensitivity of pick-up. When the setting of rheostat 86 is adjusted to provide a bias just under the point of oscillation the signals fed through jack 62 will trigger oscillator 66 to provide a continuous series of audible "beep-like" signals from speaker 82 representative of the patient's heart action.

The sensitivity adjustment of the heart monitor 10 comprising the control knob 17 provides means to obtain a heart signal pattern related to a selected amplitude level of the ECG complex. This will be readily understood by the preceding description taken together with an examination of FIG. 3 showing the normal ECG complex which consists of a series of waves or peaks of varying height, namely the P, Q, R, S, and T waves, the R wave being the highest amplitude peak, the T wave being next highest after it, and the P wave being somewhat lower in amplitude than the T wave. When knob 17 is adjusted so that sensitivity is relatively low, a single "beep" will be heard synchronous with and midway between each pulse beat. These audible "beeps" will represent the highest amplitude peaks, i.e, the peaks of the R wave. On the other hand, if knob 17 is adjusted for somewhat greater sensitivity, the audible signal complex will consist of a two "beep" pattern for each pulse representing the audible translation of the R and T waves. Still greater sensitivity will provide a triple signal pattern including the P wave, in addition to the R and T waves.

Should an arrythmia such as cardiac arrest or ventricular fibrillation occur, the resulting cessation of cardiac impulses will be immediately made known by a cessation of the audible "beep" signals so that proper and adequate treatment can be instituted, for example, injection of drugs or physical heart massage.

It will be recognized that the above described embodiment provides a reliable, easily operated, and simple apparatus for monitoring the heart signal. The transistorized cardiac monitor circuit described above, and the self-contained mercury battery power supply enclosed within the casing of the monitor provide a monitor of small size (approximately 1" x 1¾" x 4½"), and light enough in weight (approximately one-half pound) so as to be adapted for mounting on a portion of the body such as the forearm. Additionally, due to the described transistor arrangement of the monitor circuit, power consumption is low and the self-contained power supply will provide relatively long service life in normal operation. The result is a simple, easily-connected and operated, extremely sensitive heart monitor apparatus suitable for routine operation by personnel of hospitals, etc. such as nurses, etc.

It will be understood that although the described embodiment utilizes PNP transistors, a device providing similar performance could be constructed using NPN transistors with appropriate changes in battery polarity, capacitor connections, etc.

While there has been described what is at present considered to be the preferred embodiment of the invention, it will be undersood that various modifications may be made therein and are intended to be included within the scope of the appended claims.

What is claimed is:

1. In a cardiac monitor, the combination comprising: a pair of terminals adapted for connection to spaced portions of the body of a patient, a case adapted for attachment to the forearm of a human patient connected to one of said terminals, a circuit in said case connected to said terminals comprising an amplifier for amplifying electrical potentials associated with cardiac action between said terminals, said amplifier including first, second, and third amplifier stages, said first and said second stages being relatively high gain stages, a power supply connected in said circuit to provide operating voltage for said amplifier, means in said circuit for producing signals including audible signals representative of cardiac action between said terminals in response to the output of said amplifier, de-coupling means for substantially preventing voltage load surges from reaching said power supply, and means including a resistor-capacitor network connected to said second stage for preventing power supply voltage surges under audio load from being reflected into said first and said second stages.

2. Apparatus for monitoring the heart comprising a pair of electrodes adapted for attachment to spaced portions of the body of a patient, one of said electrodes comprising a case adapted for attachment to the forearm of a human patient, a circuit in said case including an amplifier for amplifying electrical potentials related to cardiac action between said electrodes, a power supply connected in said circuit to provide operating voltage for said amplifier, an oscillator connected to said amplifier, said oscillator comprising a transistor, means in said circuit for producing a series of signals representative of cardiac action between said electrodes in response to the output of said oscillator, and shunt means for preventing unwanted charge buildup at the base of said transistor, said shunt means including a diode connected between the base of said transistor and ground.

3. In a cardiac monitor, the combination comprising: a pair of electrodes adapted for attachment to spaced portions of the body of a patient, one of said electrodes comprising a case adapted for attachment to the forearm of a human patient, a circuit in said case comprising an amplifier for amplifying electrical potentials associated with cardiac action between said electrodes, a power supply connected in said circuit to provide operating voltage for said amplifier, means in said circuit for producing signals representative of cardiac action between said electrodes in response to the output of said amplifier, and means for minimizing the effect of spurious signals caused by somatic tremor comprising high frequency attenuation means including a parallel-connected resistor capacitor pair connected to said amplifier.

4. Cardiac monitor apparatus comprising a pair of terminals adapted for connection to spaced portions of the body of a patient, a case adapted for attachment to the forearm of a human patient connected to one of said terminals, a circuit in said case connected to said terminals comprising, an amplifier for amplifying electrical signals from cardiac action between said terminals, a power supply connected in said circuit to provide operating voltage for said amplifier, means including an oscillator in said circuit for producing signals representative of cardiac action between said terminals in response to the output of said amplifier, means in said circuit for minimizing the effect of spurious signals caused by somatic tremor comprising high frequency attenuation means including a capacitor connected to said amplifier, and means to connect the output of said amplifier to said oscillator or to external signal indicating means.

5. The combination in a heart monitor of a pair of terminals adapted for connection to spaced portions of the body of a patient, a case adapted for attachment to the forearm of a human patient connected to one of said terminals, a circuit in said case connected to said terminals comprising, an amplifier for amplifying electrical potentials created by cardiac action between said terminals, said amplifier having first, second, and third amplifier stages, each of said stages including a transistor having a base, an emitter, and a collector, a power supply connected in said circuit to provide operating voltage to said amplifier, means including an oscillator in said circuit for producing a series of signals representative of cardiac action in response to the output of said amplifier, a de-coupling means for substantially preventing voltage load surges from affecting said power supply, and means to modify the output of said amplifier so as to present a new output signal complex having a longer time base, thus providing a longer on time for the oscillator stage, said modifying means comprising a capacitor connected from the collector of said second stage transistor to ground.

6. Apparatus for monitoring the heart comprising a pair of electrodes adapted to contact spaced portions of a body of a patient, one of said electrodes comprising a case adapted for attachment to the forearm of a human patient, a circuit in said case connected to said electrodes including an amplifier for amplifying the electrocardiogram complex related to cardiac action between said electrodes, a power supply connected in said circuit to provide operating voltage for said amplifier, means including an oscillator for producing signals indicative of cardiac action between said electrodes in response to the output of said amplifier, means including a rheostat for controlling the sensitivity of the monitoring apparatus to obtain a desired heart signal pattern related to a selected amplitude level of the electrocardiogram complex, and high frequency attenuation means connected to said amplifier to minimize the effect of spurious signals caused by somatic tremor.

7. In a cardiac monitor, first and second electrodes adapted to contact spaced portions of the body of a patient, the first electrode comprising a case adapted for attachment to the forearm of a human patient, a circuit in said case connected to said second electrode by a lead provided with a terminal connector having a conformation including a spiral thread adapted for interlocking engagement with the connector portion of a standard hypodermic needle to adapt the monitor for use with a needle type electrode so as to ensure a positive electrical connection under difficult conditions, an amplifier in said circuit for amplifying electrical signals associated with cardiac action between said electrodes, a power supply connected in said circuit to provide operating voltage for said amplifier, means in said circuit for minimizing the effect of spurious signals caused by somatic tremor comprising high frequency attenuation means including a capacitor connected to said amplifier, and means in said circuit for producing indications representative of cardiac action between said electrodes in response to the output of said amplifier.

8. In a cardiac monitor, the combination comprising: a pair of electrodes adapted for attachment to spaced portions of a body of a patient, one of said electrodes comprising a case adapted for attachment to the forearm of a human patient, a circuit in said case connected to said electrodes, an amplifier in said circuit for amplifying electrical potentials associated with cardiac action between said electrodes, a power supply connected in said circuit to provide operating voltage for said amplifier, an oscillator connected to said amplifier, said oscillator including a load circuit, means for producing signals representative of cardiac action between said electrodes in response to the output of said oscillator, and de-coupling means for substantially preventing voltage load surges from affecting said power supply, said de-coupling means comprising a capacitor connected between the load circuit of said oscillator and ground.

References Cited in the file of this patent

UNITED STATES PATENTS

| | | |
|---|---|---|
| 1,030,543 | Saunders | June 25, 1912 |
| 2,409,749 | Foulger | Oct. 22, 1946 |
| 2,660,165 | Miller | Nov. 24, 1953 |
| 2,673,559 | Fawcett | Mar. 30, 1954 |
| 2,756,741 | Campanella | July 31, 1956 |
| 2,815,748 | Boucke | Dec. 10, 1957 |
| 2,854,968 | Wright | Oct. 7, 1958 |
| 2,865,365 | Newland | Dec. 23, 1958 |
| 2,875,750 | Boucke | Mar. 3, 1959 |
| 2,918,054 | Goolkasian | Dec. 22, 1959 |
| 2,944,542 | Barnett | July 12, 1960 |
| 3,002,185 | Bases | Sept. 26, 1961 |
| 3,029,808 | Kagan | Apr. 17, 1962 |
| 3,030,946 | Richards | Apr. 24, 1962 |
| 3,052,233 | Veling | Sept. 4, 1962 |